B. EITNER.
METHOD OF MAKING CAGES FOR ANTIFRICTION BEARINGS
APPLICATION FILED AUG. 18, 1909.

1,068,116.  Patented July 22, 1913.

Witnesses:
Frank S. Ober
Waldo M. Chapin

Inventor
Berthold Eitner
By his Attorneys
Rogers & Kennedy

UNITED STATES PATENT OFFICE.

BERTHOLD EITNER, OF BERLIN, GERMANY, ASSIGNOR TO DEUTSCHE WAFFEN- UND MUNITIONSFABRIKEN, OF BERLIN, GERMANY, A CORPORATION OF GERMANY.

METHOD OF MAKING CAGES FOR ANTIFRICTION-BEARINGS.

1,068,116. Specification of Letters Patent. Patented July 22, 1913.

Application filed August 18, 1909. Serial No. 513,445.

*To all whom it may concern:*

Be it known that I, BERTHOLD EITNER, a subject of the Emperor of Germany, residing at Berlin, Germany, have invented certain new and useful Improvements in Methods of Making Cages for Antifriction-Bearings, of which the following is a specification, reference being had therein to the accompanying drawing.

This invention relates to the production of cages for anti-friction bearings, and the invention consists of an improved method of procedure by means of which a blank with a series of holes to receive the rolling elements, is so deformed or changed in shape that the walls of the openings are caused to embrace the rolling elements at points coincident with their axes of rotation.

In the accompanying drawings I have illustrated my invention as carried out for the production of a cage for rolling elements in the form of balls for use in a bearing intended to take mainly radial loads, but the invention is applicable as well to an end-thrust bearing, and also in connection with bearings in which the rolling elements are in the form of rolls.

Figure 1:
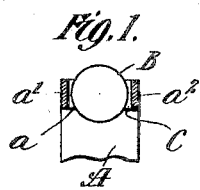
Figure 2:
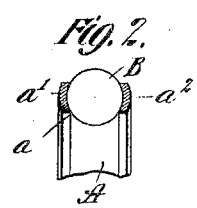
Figure 3:
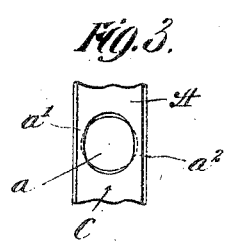
Figure 8:
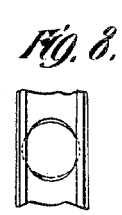
Figure 4:
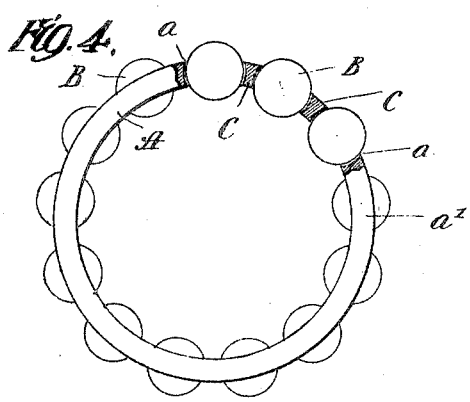
Figure 5:
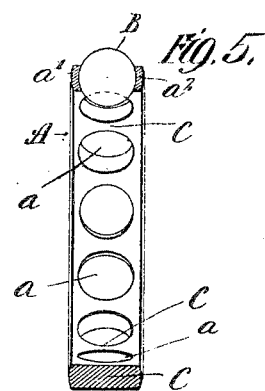

In the drawings: Figure 1 represents a portion of the blank with one of the ball receiving openings, and showing a ball in position previous to the deformation of the blank to confine the ball; Fig. 2 is a similar view, showing the blank deformed and the ball confined in the opening; Fig. 3 is a plan view of the same; Fig. 4 is a plan view of the cage complete, a portion being in section to show the elongated form of the openings; Fig. 5 is a longitudinal section through Fig. 4; Figs. 6, 7, 8, 9 and 10 are views corresponding to Figs. 1 to 5, and illustrating the method carried out in connection with a cage of modified form.

Carrying out my invention to produce a cage of the form represented in Figs. 4 and 5, I provide a blank A, a portion of which is represented in Fig. 1, and which consists of a ring or section of a cylinder. In this blank I form a number of openings $a$, but one being shown in Fig. 1, of a diameter slightly larger than that of the balls B, which operation will leave walls $a^1$ and $a^2$ at the outer sides respectively of the openings, and connecting portions C between the openings. The balls are then placed in the openings, and the walls $a^1$, $a^2$, of the latter forced inwardly toward each other, so that they will be caused to embrace the balls at diametrically opposite points coincident with their axis of rotation, as shown in Fig. 2. In effecting this forcing of the walls inwardly, I prefer to apply the pressure to the blank on opposite sides, and throughout its entire extent, the result of this action being to reduce the width of the portions C of the blank between the openings, and in fact the width of the entire blank as a whole, with the result that the openings will be contracted in the direction of the axis of rotation of the balls, as shown in Fig. 3. The balls will thus be confined by the walls at their axis of rotation, but will have a slight clearance or play in the direction of travel or course, and this by reason of the formation of the original openings of a diameter greater than the diameter of the balls.

Figure 6:
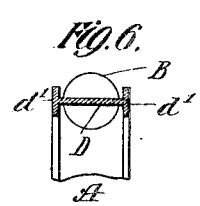
Figure 7:
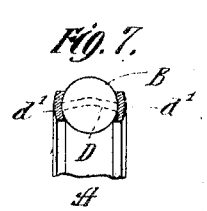
Figure 9:
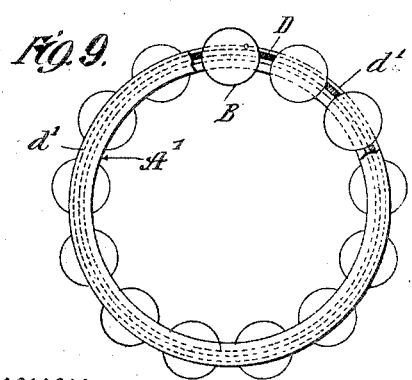
Figure 10:
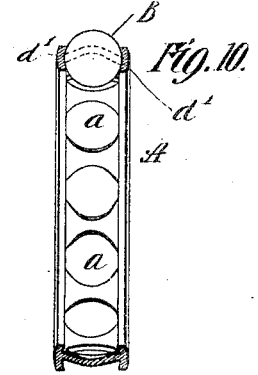

Figs. 6, 7, 8, 9 and 10 illustrate the same method of procedure as that described, but in connection with a blank of different form and for the production of a light cage of the completed form shown in Figs. 9 and 10. The blank in this case consists of a ring $A^1$, a portion only of which is shown in Fig. 6, which ring comprises a web D and edge flanges $d^1$. Holes are formed in the web, and like in the first instance described, of a diameter slightly greater than the diameter of the balls, leaving side walls at the outer sides of the openings, and formed by the edge flanges, and leaving connecting portions between the openings, and formed by the web. The balls are then placed in these openings, and by suitable means the flanges are subjected from opposite sides to pressure, and preferably throughout their extent, with the result that the connecting web will be bent on a circumferential line, as shown in Fig. 7, thereby reducing the width of the blank throughout, and at the same time causing the flanges or side walls of the openings to approach each other, and embrace the balls at diametrically opposite points. As in the first case described, and by reason of the greater diameter given to the openings as originally formed, the latter will be elongated, so that the balls will have a slight freedom or play in the direction of travel.

My improved method may be performed by any suitable means, or by mechanism, or by hand, provided that the results obtained are substantially as indicated above, and I desire to be understood that the invention is not limited to any special means for carrying the method into effect, or to any specific mode of procedure, except in so far as such limitations are specified in the claims.

Having thus described my invention, its construction and mode of operation, what I claim and desire to secure by Letters Patent of the United States is as follows:

1. The method of making cages for antifriction bearings, which consists in providing a circular blank, forming a series of openings therein to receive the rolling elements, and contracting said blank in width by pressure to cause the walls of the openings to embrace the rolling elements.

2. The method of making cages for antifriction bearings, which consists in providing a blank having edge flanges and a connecting web, forming a series of openings in said web to receive the rolling elements, bending the web portions of the blank between the openings, thereby reducing the width of the blank throughout, and bending the flanges inwardly to embrace the rolling elements.

In testimony whereof I have affixed my signature in presence of two witnesses.

BERTHOLD EITNER.

Witnesses:
  WOLDEMAR HAUPT,
  HENRY HASPER.